(12) United States Patent
Itoh

(10) Patent No.: US 9,327,578 B2
(45) Date of Patent: May 3, 2016

(54) AIR-CONDITIONER FOR VEHICLE

(75) Inventor: Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 281 days.

(21) Appl. No.: 13/556,562

(22) Filed: Jul. 24, 2012

(65) Prior Publication Data

US 2013/0025310 A1    Jan. 31, 2013

(30) Foreign Application Priority Data

Jul. 31, 2011  (JP) ................................. 2011-167883

(51) Int. Cl.
B60H 3/00      (2006.01)
B61D 27/00     (2006.01)
B60H 1/00      (2006.01)

(52) U.S. Cl.
CPC ........ B60H 1/00064 (2013.01); B60H 1/00664 (2013.01); B60H 1/00835 (2013.01); B60H 1/00842 (2013.01); B60H 2001/00135 (2013.01); B60H 2001/00192 (2013.01)

(58) Field of Classification Search
CPC .............. B60H 1/00064; B60H 2001/00135; B60H 2001/00192; B60H 1/00664; B60H 1/00835; B60H 1/00842
USPC ............................................. 165/203, 42, 43
See application file for complete search history.

(56) References Cited

U.S. PATENT DOCUMENTS

| 4,718,244 A * | 1/1988 | Kobayashi ................... 62/176.5 |
| 5,537,831 A | 7/1996 | Isaji et al. |
| 5,794,845 A * | 8/1998 | Ito et al. ................... 237/12.3 B |
| 6,009,934 A * | 1/2000 | Sunaga et al. ................... 165/42 |
| 6,145,754 A | 11/2000 | Uemura et al. |
| 6,192,698 B1 * | 2/2001 | Kakehashi et al. ............. 62/227 |
| 6,293,123 B1 * | 9/2001 | Iritani et al. ..................... 62/409 |
| 6,308,770 B1 | 10/2001 | Shikata et al. |
| 2004/0079096 A1 * | 4/2004 | Itoh et al. ........................ 62/223 |
| 2007/0137833 A1 * | 6/2007 | Kang et al. ....................... 165/42 |

(Continued)

FOREIGN PATENT DOCUMENTS

| JP | 07-001954 | 1/1995 |
| JP | 09-104216 | 4/1997 |

(Continued)

OTHER PUBLICATIONS

Machine translation of JP 2001-171327.*

(Continued)

Primary Examiner — Mohammad M Ali
Assistant Examiner — Daniel C Comings
(74) Attorney, Agent, or Firm — Harness, Dickey & Pierce, P.L.C.

(57) ABSTRACT

An air-conditioner that conditions air inside a passenger compartment of a vehicle using a heat pump refrigerating cycle includes: a case having at least a first air passage and a second air passage independent from each other; an indoor heat exchanger cooling air; and a heating heat exchanger heating air. Inside of the heating heat exchanger is divided into a first section corresponding to the first air passage and a second section corresponding to the second air passage. The first section and the second section are located adjacent with each other through a border portion. The heating heat exchanger has a refrigerant passage through which refrigerant flows in parallel with the border portion.

13 Claims, 5 Drawing Sheets

(56) References Cited

U.S. PATENT DOCUMENTS

2007/0215339 A1* 9/2007 Kumada et al. ............... 165/203
2010/0043470 A1* 2/2010 Kang et al. .................... 62/239
2010/0051228 A1* 3/2010 Han .................................. 165/41

FOREIGN PATENT DOCUMENTS

| JP | H09-104216 | 4/1997 |
| JP | 10-086637 | 4/1998 |
| JP | H10-086637 | 4/1998 |
| JP | 2001-171327 | * 6/2001 |
| JP | 2005-145325 | 6/2005 |
| JP | 2006-306146 | 11/2006 |
| JP | 2008-100630 | 5/2008 |
| JP | 2009-023564 | 2/2009 |

OTHER PUBLICATIONS

Office Action issued May 7, 2013 in corresponding Japanese Application No. 2011-167883 (with English translation).

* cited by examiner

… (US 9,327,578 B2)

AIR-CONDITIONER FOR VEHICLE

CROSS REFERENCE TO RELATED APPLICATION

This application is based on Japanese Patent Application No. 2011-167883 filed on Jul. 31, 2011, the disclosure of which is incorporated herein by reference in its entirety.

TECHNICAL FIELD

The present disclosure relates to an air-conditioner for a vehicle.

BACKGROUND

Conventionally, an air-conditioner for a vehicle heats air inside of a passenger compartment by using waste heat of the engine as a heat source. Moreover, a temperature of conditioned air can be set individually for a driver-side space and a passenger-side space to raise the comfortableness of the passenger compartment. In such the air-conditioner, a heat amount required for the heating operation is obtained through a heater core, and unnecessary heat is radiated out of the vehicle through a radiator.

However, waste heat of the engine is insufficient in an electric car. JP-A-7-1954 (U.S. Pat. No. 5,537,831) describes an air-conditioner which performs cooling operation and heating operation using a heat pump refrigerating cycle.

In the heat pump refrigerating cycle, flow rate of refrigerant is controlled by controlling rotation speed of a compressor so that the amount of heat released into the passenger compartment is controlled. The air-conditioner of JP-A-7-1954 does not have a heat exchanger which radiates heat out of the passenger compartment.

In the above-mentioned air-conditioner using waste heat of the engine, in a case where the temperature control is performed independently between the driver-side space and the passenger-side space (hereinafter referred as independent control), the heat release amount is controlled by controlling each air mix (AIM) door, and excess heat is radiated out of the passenger compartment from the radiator.

In contrast, in the case of the heat pump refrigerating cycle, the independent control cannot be realized only by controlling the air mix door. For example, if the preset temperature is lowered on the passenger-side space from the state where the same temperature is set for the driver-side space and the passenger-side space, the amount of heat used for heating the passenger compartment is reduced. In this case, if the air amount is reduced for the passenger-side space only by controlling the air mix door, the heat release amount is increased on the driver-side space, and the amount of heat used for heating the passenger compartment does not change.

Then, it becomes an object, for the air-conditioner using the heat pump refrigerating cycle, to achieve the independent control by changing the amount of heat used for heating the passenger compartment.

SUMMARY

It is an object of the present disclosure to provide an air-conditioner using a heat pump refrigerating cycle that can condition air for plural spaces, independently, inside a passenger compartment of a vehicle.

According to an example of the present disclosure, an air-conditioner that conditions air inside of a passenger compartment of a vehicle using a heat pump refrigerating cycle includes a case, a blower, an indoor heat exchanger, and a heating heat exchanger. The case has at least a first air passage and a second air passage independent from each other and extending in an air flowing direction. The blower sends air into the case. The indoor heat exchanger is disposed in the case to cool air sent by the blower. The heating heat exchanger is disposed downstream of the indoor heat exchanger in the case to heat air passing through the indoor heat exchanger. The indoor heat exchanger and the heating heat exchanger are a part of the heat pump refrigerating cycle. Inside of the heating heat exchanger is divided into a first section corresponding to the first air passage and a second section corresponding to the second air passage when the case is seen in the air flowing direction. The first section and the second section are located adjacent with each other through a border portion. The heating heat exchanger has a refrigerant passage through which refrigerant flows in parallel with the border portion.

Accordingly, the air-conditioner using the heat pump refrigerating cycle can condition air for plural spaces, independently, inside the passenger compartment of the vehicle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
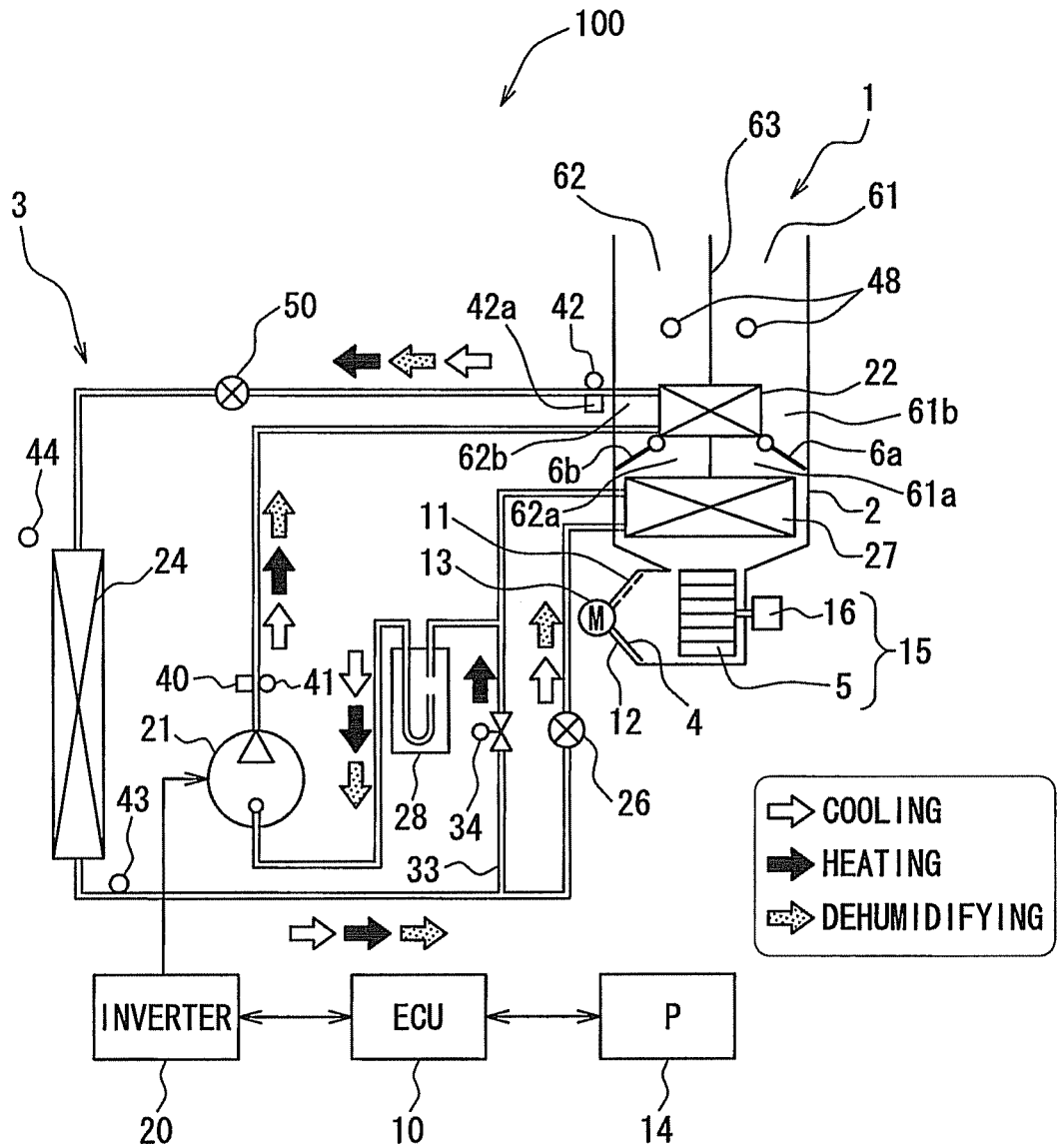
FIG. 1 is a schematic view illustrating an air-conditioner according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment will be described with reference to FIGS. 1-3.

As shown in FIG. 1, an air-conditioner 100 includes an air conditioning unit 1 and an electronic control unit 10 (ECU) that controls the unit 1, and conditions air inside of a passenger compartment of a vehicle.

The air conditioning unit 1 conducts temperature control and changes an air outlet mode for a driver space and a passenger space, independently. The driver space represents a space including a driver seat and a rear seat behind the driver seat. The passenger space represents a space including a passenger seat, that is next to the driver seat, and a rear seat behind the passenger seat. The air conditioning unit 1 is located under an instrument board (not shown) ahead of the passenger compartment, and is located in the center in a left-and-right direction of the vehicle.

The air conditioning unit 1 has a case 2, a blower 15, and a refrigerating cycle 3. The case 2 defines an air passage through which air passes. The blower 15 generates air flow in the case 2. The refrigerating cycle 3 has an evaporator 27 and a heating heat exchanger 22. The evaporator 27 cools air flowing through the case 2. The heating heat exchanger 22 heats air passing through the evaporator 27.

The case 2 is arranged on a front side in the passenger compartment. The case 2 has an inside air inlet 11 and an outside air inlet 12 at the upstream end in the air flowing direction. The inside air inlet 11 draws air inside of the passenger compartment (hereinafter referred as inside air), and the outside air inlet 12 draws air outside of the passenger compartment (hereinafter referred as outside air). An air switching door 4 is rotatably disposed at inner sides of the inlets 11, 12, and is driven by an actuator 13 such as servo motor. The door 4 switches an air inlet mode between an outside air introduction (FRS) mode and an inside air circulation (REC) mode.

The case 2 has plural air outlets (not shown) at the downstream end in the air flowing direction. The plural air outlets respectively correspond to plural seats of the vehicle. The plural seats are constructed by at least a predetermined seat such as driver seat and the other seat. In this embodiment, the predetermined seat is a seat in the driver space, and the other seat is a seat in the passenger space. Conditioned air is blown off toward each of the spaces through the corresponding air outlet.

Next, the refrigerating cycle 3 will be described. The refrigerating cycle 3 includes a refrigerant piping which annularly connects a compressor 21, the heating heat exchanger 22, a first decompression part, an outdoor heat exchanger 24, a second decompression part, the evaporator 27, and an accumulator 28. The compressor 21 is driven to rotate by a drive motor (not shown). The electric compressor 21 compresses refrigerant drawn from the evaporator 27 to have high temperature and high pressure, and discharges the compressed refrigerant. The compressor 21 works by being energized (ON), and stops working by stopping the electricity supply (OFF). The rotating speed of the compressor 21 is controlled by an inverter 20 so as to have a target rotational speed computed by the ECU 10.

The heating heat exchanger 22 is arranged in the case 2, and is located downstream of the evaporator 27 in the air flowing direction. The heating heat exchanger 22 heats air passing inside by exchanging heat with refrigerant gas flowing from the compressor 21.

The first decompression part includes a variable throttle valve 50 into which refrigerant flows from the heating heat exchanger 22. The variable throttle valve 50 is an expansion valve device, and decompresses refrigerant flowing out of the heating heat exchanger 22 based on the valve opening. The variable throttle valve 50 may be an electric expansion valve for heating (EVH), and the valve opening is electrically controlled by the ECU 10. The valve opening of the valve 50 can be fully opened by the ECU 10 when a full open mode is set. In this case, the valve 50 functions as mere piping without decompressing refrigerant.

The outdoor heat exchanger 24 is placed out of the case 2 at a position which can easily receive wind generated when the vehicle travels (specifically front part of the engine compartment). The outdoor heat exchanger 24 causes heat exchange between refrigerant which flows inside the outdoor heat exchanger 24 and outside air sent by an electromotive fan (not shown). The outdoor heat exchanger 24 is operated as a heat absorber absorbing heat from outside air at the time of heating mode. Moreover, the outdoor heat exchanger 24 is operated as a radiator which radiates heat to outside air at the time of cooling mode.

The second decompression part has a variable throttle valve 26 and a bypass pipe 33. Refrigerant flowing from the outdoor heat exchanger 24 flows into the valve 26, or flows into the bypass pipe 33 by bypassing the throttle valve 26 and the evaporator 27 so as to be sent to the accumulator 28. The variable throttle valve 26 is a decompression device decompressing refrigerant flowing out of the outdoor heat exchanger 24 based on the valve opening. The variable throttle valve 26 may be an electric expansion valve for cooling (EVC), and the valve opening is electrically controlled by the ECU 10. Moreover, an electromagnetic open/close valve 34 (VH) is arranged in the bypass pipe 33, and is opened by being energized (ON). The valve 34 is closed when the electricity supply is stopped (OFF).

The evaporator 27 is an indoor heat exchanger that evaporates refrigerant decompressed by the valve 26 by heat exchange with air sent by a centrifugal fan 5 of the blower 15. The evaporator 27 is air-refrigerant heat exchanger (heat absorber) which supplies refrigerant gas to the compressor 21 through the accumulator 28. The accumulator 28 is a gas-liquid separation device, and can store excess liquid refrigerant flowing from the evaporator 27.

A switching portion switches the operation mode of the refrigerating cycle 3. That is, a circulation route of refrigerant is selected among a cooling mode, a heating mode, and a dehumidification (and heating) mode. In this embodiment, the variable throttle valve 50 and the electromagnetic open/close valve 34 correspond to the switching portion.

Specifically, when the variable throttle valve 50 is fully opened, and when the valve 34 is closed, the operation mode of the refrigerating cycle 3 is set into the cooling mode. When the variable throttle valve 50 is set to decompress refrigerant to produce small flow rate, and when the valve 34 is opened, the operation mode of the refrigerating cycle 3 is set into the heating mode. When the variable throttle valve 50 is set to decompress refrigerant to produce small flow rate, and when the valve 34 is closed, the operation mode of the refrigerating cycle 3 is set into the dehumidification mode.

As shown in FIG. 1, a first independent passage 61 and a second independent passage 62 are defined downstream of the evaporator 27 in the air flowing direction. The first and second independent passages 61 and 62 are independent from each other. The first independent passage 61 is a passage for conditioning air in the driver space. The second independent passage 62 is a passage for conditioning air in the passenger space.

Figure 2:
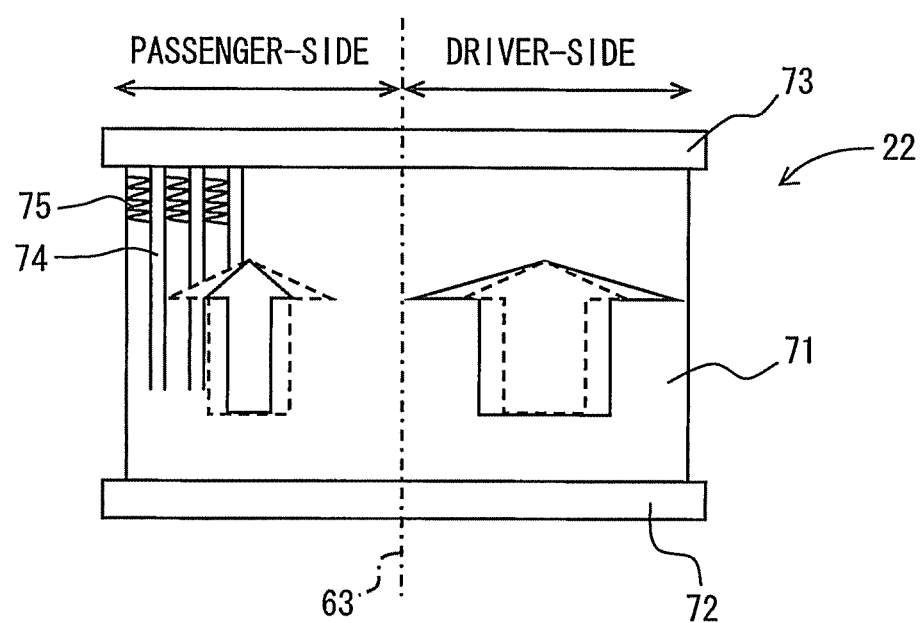
FIG. 2 is a schematic front view illustrating a heating heat exchanger of the air-conditioner.

FIG. 2 is a front view illustrating the arrangement relationship of the heating heat exchanger 22 and the first and second independent passages 61 and 62. The heating heat exchanger 22 will be described with reference to FIG. 2. In the heating heat exchanger 22, heat is exchanged between refrigerant flowing inside and air passing outside. The heating heat exchanger 22 includes a core part 71, an inflow tank 72, and an outflow tank 73.

The core part 71 is constructed by layering plural inner tubes 74 and plural outer fins 75. Each of inner tubes 74 extends in an up-and-down direction of FIG. 2. One end of the inner tube 74 is connected to the inflow tank 72, and the other end of the inner tube 74 is connected to the outflow tank 73. The tube 74 is a pipe component inside of which refrigerant circulates. The plural inner tubes 74 are arranged in a left-and-right direction of FIG. 2. The inflow tank 72 and the outflow tank 73 extend in the arrangement direction of the tubes 74. The tubes 74 extend parallel or approximately parallel with each other.

The outer fin 75 is arranged between the inner tubes 74, and transmits heat of refrigerant flowing through the inside of the inner tube 74 to air flowing around the fin 75. Each of the outer fins 75 is located between the inner tubes 74 adjacent with each other. The inner tube 74 and the outer fin 75 are alternately stacked. The outer fin 75 is fabricated into a wave shape, for example, from a thin plate material, as a corrugated type fin.

The inflow tank 72 extends in the arrangement direction of the inner tubes 74. The ends of the inner tubes 74 are joined to the inflow tank 72 by brazing, respectively. Refrigerant currently stored in the inflow tank 72 flows into each of the inner tubes 74, and flows from the inflow tank 72 to the outflow tank 73. The inflow tank 72 distributes and supplies refrigerant flowing from the compressor 21 for each inner tube 74. Thus, the heating heat exchanger 22 has the all-path type core part 71.

The outflow tank 73 extends in the arrangement direction of the inner tube 74. The other ends of the inner tubes 74 are joined to the outflow tank 73 by brazing, respectively. Refrigerant flowing through each of the inner tubes 74 is gathered by the outflow tank 73, and the gathered refrigerant flows into the outdoor heat exchanger 24.

Next, the arrangement relationship between the first and second independent passages 61, 62 and the heating heat exchanger 22 is explained. As shown in arrow directions of FIG. 2, refrigerant flows upward from the lower part in FIG. 2, when seen in the air flowing direction of the case 2. The up-and-down direction of FIG. 2 corresponds to a vertical direction. The heating heat exchanger 22 is mounted to the vehicle in a manner that refrigerant flows from the lower side to the upper side in the vertical direction.

As shown in FIG. 1, the first and second independent passages 61 and 62 are divided and partitioned by a partition plate 63. The plate 63 is indicated by a simplified single chain line in FIG. 2. Here, in FIG. 2, the air flowing direction is perpendicular to the arrangement direction of the tubes 74 (left-and-right direction in FIG. 2) and the refrigerant flowing direction (up-and-down direction in FIG. 2). When the case 2 is seen in the air flowing direction, the plate 63 partitions inside space of the heating heat exchanger 22 into a first section and a second section.

The first section (right-side of the plate 63 in FIG. 2) corresponds to the first independent passage 61, and the second section (left-side of the plate 63 in FIG. 2) corresponds to the second independent passage 62. The plate 63 corresponds to a border portion defined between the first section and the second section adjacent with each other, and extends in the refrigerant flowing direction (up-and-down direction of FIG. 2) in the heating heat exchanger 22. Therefore, refrigerant in each of the first section and the second section of the heating heat exchanger 22 flows in parallel with the border portion.

As shown in FIG. 1, the first independent passage 61 has a first warm passage 61a through which warm air heated with the heating heat exchanger 22 passes, and a first cool passage 61b through which cool air passes through the evaporator 27 and bypasses the heating heat exchanger 22.

Similarly, the second independent passage 62 has a second warm passage 62a through which warm air heated with the heating heat exchanger 22 passes, and a second cool passage 62b through which cool air passes through the evaporator 27 and bypasses the heating heat exchanger 22.

A driver-side air mix door 6a and a passenger-side air mix door 6b are arranged upstream of the heating heat exchanger 22 in the air flowing direction, so as to perform temperature control independently for each of the driver space and the passenger space. The driver-side door 6a controls the temperature of conditioned air to be blown toward the driver space, and the passenger-side door 6b controls the temperature of conditioned air to be blown toward the passenger space. That is, the air mix door 6a, 6b controls a ratio between the warm air passing through the warm passage 61a, 62a and the cool air passing through the cool passage 61b, 62b. The door 6a, 6b is driven by an actuator such as servo motor.

A driver-side defroster outlet, center face outlet, side face outlet, and foot outlet are defined, as the air outlet, downstream of the first independent passage 61 in the air flowing direction through each duct, for example.

A passenger-side defroster outlet, center face outlet, side face outlet, and foot outlet are defined, as the air outlet, downstream of the second independent passage 62 in the air flowing direction through each duct, for example.

Conditioned air is blown out toward a front windshield of the vehicle through the driver-side and passenger-side defroster outlets. Conditioned air is blown out toward head and breast of a driver through the driver-side face outlet, and blown out toward head and breast of a passenger through the passenger-side face outlet. Conditioned air is blown out toward foot of a driver and a passenger, respectively, through the driver-side and passenger-side foot outlets.

Moreover, a rear-side center face outlet, side face outlet, and foot outlet are defined downstream of each of the first independent passage 61 and the second independent passage 62 in the air flowing direction, for a passenger seated on a rear seat.

The air outlet mode for the driver space and the passenger space has a face mode, a bilevel (B/L) mode, a foot mode, a foot/defroster mode and a defroster mode.

The ECU 10 is a control means having CPU which performs processing and computing, a memory (ROM, RAM) which saves various programs and data, an I/O port, a timer, etc., and is constructed by a microcomputer with a well-known structure. When an ignition switch of the vehicle is turned on (IG-ON), electric power is supplied to the ECU 10, and the ECU 10 electrically controls the servo motor 13, a blower motor 16, the throttle valves 26 and 50, the electromagnetic open/close valve 34, and the inverter 20 based on manipulate signal input in an air-conditioner console panel 14, sensor signal output from various sensors, and the control program stored in the memory.

The air-conditioner console panel 14 will be described. The air-conditioner console panel 14 is integrally installed in an instrument panel. The air-conditioner console panel 14 has a liquid crystal display, an inside/outside air switch, a front defroster switch, a rear defroster switch, a dual switch, an air outlet mode switch, a blower flow rate switch, an air-conditioning (A/C) switch, an auto switch, an OFF switch, a driver space temperature setting switch, a passenger space temperature setting switch, etc.

The liquid crystal display has a setting temperature displayer, an air outlet mode displayer, an air flow rate displayer, etc. The setting temperature displayer visually indicates the setting temperature set for the driver space and the setting temperature set for the passenger space. The air outlet mode displayer visually indicates the air outlet mode, and the air flow rate displayer visually indicates the air flow rate of the blower. Moreover, an outside air temperature displayer, a suction mode displayer, a time displayer, etc. may be disposed on the liquid crystal display. Various kinds of operation switches defined on the air-conditioner console panel 14 may be defined in the liquid crystal display.

The various kinds of switches of the air-conditioner console panel 14 are explained. The front defroster switch orders to raise anti-fogging capability of the front windshield, and the air outlet mode is set into the defroster mode through the front defroster switch. As an alternative to the defroster switch, without fixing the defroster mode, only a dehumidification may be ordered for the passenger compartment through a dehumidification switch, or only anti-fogging may be ordered for the front windshield. Further, a fogging sensor which detects the fogging state of the front windshield may be added as a dehumidification mode setting portion.

The mode switch requires to set the air outlet mode as one of the face mode, bilevel (B/L) mode, foot mode or foot/defroster mode, in accordance with manual operation conducted by an occupant of the vehicle such as driver or passenger. The air-conditioner (A/C) switch is used for setting the cooling or dehumidification operation for the passenger compartment, by selecting the cooling or dehumidification mode for the refrigerating cycle 3. When the A/C switch is turned on, the compressor 21 of the refrigerating cycle 3 is started compulsorily. When the A/C switch is turned off, the compressor 21 of the refrigerating cycle 3 is compulsorily stopped. The temperature setting switch is used for setting the desired temperature (Tset), for each of the driver space and the passenger space.

A discharge pressure sensor 40 detects a discharge pressure (SP) of refrigerant discharged from the compressor 21. A discharge temperature sensor 41 detects a discharge temperature (TD) of refrigerant discharged from the compressor 21. A first refrigerant temperature sensor 42 detects a refrigerant temperature (TCO) at the refrigerant outlet of the heating heat exchanger 22 which flows out of the heating heat exchanger 22. A second refrigerant temperature sensor 43 detects a refrigerant temperature (THO) at the refrigerant outlet of the outdoor heat exchanger 24 which flows out of the outdoor heat exchanger 24. Signals output from the sensors 40, 41, 42, 43 are input into the ECU 10.

The discharge pressure sensor 40 is a detector that detects a high pressure of the refrigerating cycle 3. The discharge temperature sensor 41 is a detector that detects a refrigerant inlet temperature at the inlet of the heating heat exchanger 22. Moreover, a high-pressure side refrigerant pressure sensor 42a is arranged in the refrigerating cycle 3, and detects a pressure of refrigerant before decompressed by the variable throttle valve 50. Signal output from the high-pressure side refrigerant pressure sensor 42a is similarly input into the ECU 10.

An outside air temperature sensor 44 detects outside air temperature (TAM) outside of the passenger compartment. An after-evaporator temperature sensor (not shown) detects air temperature (TE: referred as after-evaporator temperature) immediately downstream of the evaporator 27. An inside air temperature sensor (not shown) detects an inside air temperature (TR) inside the passenger compartment. A solar sensor (not shown) detects a solar radiation amount (TS) incident into the passenger compartment. A temperature sensor 48 detects an air temperature (TGC) immediately downstream of the heating heat exchanger 22 in the air flowing direction. Sensor signals output from the above sensors are input into the ECU 10 after having A/D conversion processed by an A/D conversion circuit. The temperature sensor 48 is placed for each of the first independent passage 61 and the second independent passage 62.

The ECU 10 sets the operation mode for the refrigerating cycle 3, and controls the compressor 21 (rotation speed), the open degree of the variable throttle valve 50, 26 and the open/close state of the electromagnetic valve 34 to improve and maximize the cycle efficiency of the refrigerating cycle 3 in each operation mode.

When the refrigerating cycle 3 is set to have the cooling mode, the variable throttle valve 50 is fully opened, and the valve 34 is closed. Thus, refrigerant flowing out of the compressor 21 circulates in order of the heating heat exchanger 22, the fully-opened variable throttle valve 50, the outdoor heat exchanger 24, the variable throttle valve 26, the evaporator 27, the accumulator 28 and the compressor 21, as shown of a blank arrow direction of FIG. 1 (cooling circuit and cycle).

When the cooling mode is chosen, the open degree of the air mix door 6a, 6b is controlled to be fully closed (MAX-COOL). High-temperature and high-pressure refrigerant breathed out of the compressor 21 does not radiate heat while passing through the heating heat exchanger 22. Therefore, air cooled by the evaporator 27 bypasses the heating heat exchanger 22. For example, the cooled air is blown from the face outlet into the passenger compartment so as to cool the inside of the passenger compartment to have the desired temperature (preset temperature).

When the dehumidification mode is chosen as the operation mode of the refrigerating cycle 3, the variable throttle valve 50 is set to have the decompressing mode, and the valve 34 is closed. Refrigerant breathed out from the compressor 21 circulates in order of the heating heat exchanger 22, the variable throttle valve 50, the outdoor heat exchanger 24, the variable throttle valve 26, the evaporator 27, the accumulator 28, and the compressor 21 as shown of a dot-filled arrow direction of FIG. 1 (dehumidification circuit and cycle).

Air cooled and dehumidified in the evaporator 27 is reheated by the heating heat exchanger 22. For example, the reheated air is blown off from the defroster outlet or the foot outlet into the passenger compartment, to have the desired temperature (preset temperature). Further, the inside of the passenger compartment is dehumidified and heated to defog the front windshield. The pressure of refrigerant breathed out from the compressor 21 and the refrigerant pressure of the outdoor heat exchanger 24 are varied based on the throttle degree of the variable valve for heating 50 and the variable valve for cooling 26. Thus, the heating capacity of the heating heat exchanger 22 or the dehumidification capacity of the evaporator 27 is controlled to have a target value. The heating capacity of the heating heat exchanger 22 corresponds to a temperature of air immediately after the heating heat exchanger 22 and/or a temperature of air blown out. The dehumidification capacity of the evaporator 27 corresponds to the after-evaporator temperature.

Specifically, when the refrigerant pressure of the outdoor heat exchanger 24 is set to be low (e.g., the open degree of the variable valve 50 is small, and the open degree of the variable valve 26 is large), the outdoor heat exchanger 24 functions as a heat sink. The amount of heat radiated in the heating heat exchanger 22 increases, and the temperature of conditioned air to be blown into the passenger compartment becomes comparatively high.

On the contrary, when the refrigerant pressure of the outdoor heat exchanger 24 is set to be high (e.g., the open degree of the variable valve 50 is large, and the open degree of the variable valve 26 is small), the outdoor heat exchanger 24 functions as a radiator. The amount of heat radiated in the heating heat exchanger 22 decreases, and the temperature of conditioned air to be blown into the passenger compartment becomes comparatively low.

Next, when the heating mode is chosen as the operation mode of the refrigerating cycle 3, the variable throttle valve 50 is set to have the decompressing mode, and the valve 34 is opened. Refrigerant breathed out from the compressor 21 circulates in order of the heating heat exchanger 22, the variable throttle valve 50, the outdoor heat exchanger 24, the electromagnetic open/close valve 34, the accumulator 28, and the compressor 21 as shown of a black-filled arrow direction of FIG. 1 (heating circuit and cycle). In addition, when the heating mode is chosen, the variable valve for cooling 26 is fully closed.

The open degree of each air mix door 6a and 6b is controlled to be fully opened (MAX-HOT). When high-temperature and high-pressure refrigerant breathed out from the compressor 21 passes the heating heat exchanger 22, the refrigerant exchanges heat with air flowing through the inside of the case 2 to radiate heat. For example, the heated air is blown off from the foot outlet into the passenger compartment, and the inside of the passenger compartment is heated to have the desired temperature (preset temperature).

Figure 3:
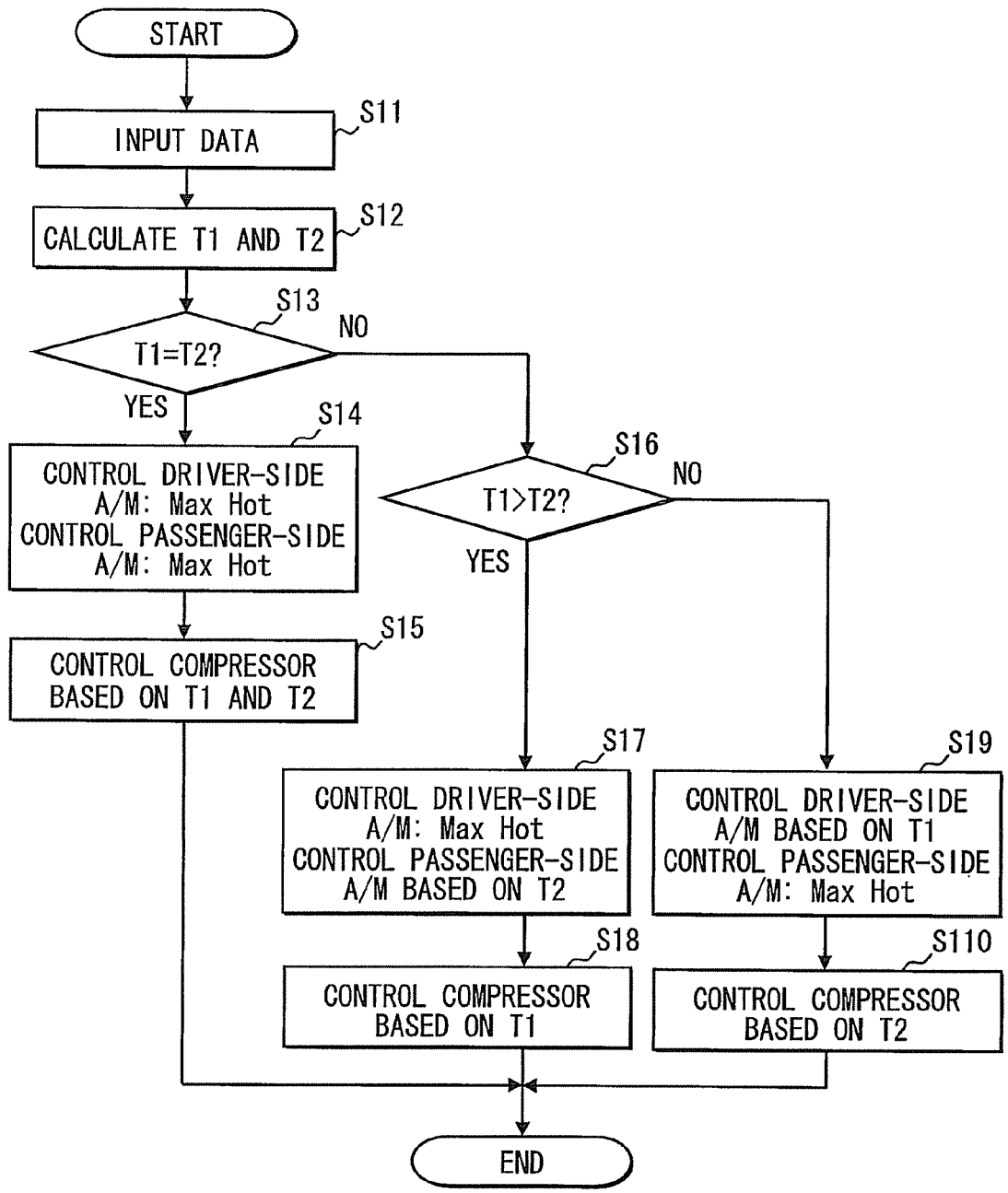
FIG. 3 is a flow chart illustrating a heating mode process processed by an electronic control unit of the air-conditioner.

FIG. 3 is a flow chart illustrating a process conducted by the ECU 10 at the heating mode. The process of FIG. 3 is performed every predetermined time period, when the ignition switch is in the ON state so that the electric power is supplied to the ECU 10. Moreover, when the ignition switch is switched from ON to OFF, the electric power supplied to the ECU 10 is stopped, and the process is ended compulsorily. The process shown in FIG. 3 is started in a state where the variable valve 50 has the decompressing mode and where the valve 34 is opened, as the heating mode.

At S11, various data is read into the memory for data processing, and the process moves to S12. Specifically, at S11, signals output from the various operation switches of the air-conditioner console panel 14 and the various sensors are input into the ECU 10. The signals are, for example, the inside air temperature Tr, the outside air temperature Tam, the solar amount Ts, and the air temperature TGC immediately after the heating heat exchanger 22.

At S12, a target temperature T1 of conditioned air to be blown for the driver space and a target temperature T2 of conditioned air to be blown for the passenger space are calculated by incorporating the input data into a memorized computing equation, and the process moves to S13.

At S13, the ECU 10 determines whether the target temperature T1 for the driver space and the target temperature T2 for the passenger space are equal with each other. If the calculated temperatures T1 and T2 are equal with each other, the process moves to S14. If the calculated temperatures T1 and T2 are not equal with each other, the process moves to S16.

At S14, because the target temperatures T1 and T2 are mutually equal, the open degree of each air mix door 6a and 6b is controlled to become the maximum (MAX-HOT), and the process moves to S15.

At S15, the rotation number of the compressor 21 is controlled in a manner that the driver space and the passenger space have the target temperature (T1=T2), and the process is ended.

At S16, the air-conditioning is performed independently for the driver space and the passenger space, because the target temperatures T1 and T2 are not mutually equal. The ECU 10 determines which is larger between the target temperature T1 for the driver space and the target temperature T2 for the passenger space. When the target temperatures T1 for the driver space is higher than the target temperature T2 for the passenger space, the process moves to S17. When the target temperatures T1 for the driver space is lower than the target temperature T2 for the passenger space, the process moves to S19.

At S17, because the target temperature T1 for the driver space is high, the open degree of the driver-side air mix door 6a is controlled to become the maximum (MAX-HOT), and the open degree of the passenger-side air mix door 6b is controlled such that the passenger space has the target temperature T2, then the process moves to S18.

At S18, the rotation number of the compressor 21 is controlled using input value of the driver-side sensor such that the driver space has the target temperature T1, and the process is ended.

At S19, because the target temperature T2 for the passenger space is high, the open degree of the passenger-side air mix door 6b is controlled to become the maximum (MAX-HOT), and the open degree of the driver-side air mix door 6a is controlled such that the driver space has the target temperature T1, then the process moves to S110.

At S110, the rotation number of the compressor 21 is controlled using input value of the passenger-side sensor such that the passenger space has the target temperature T2, and the process is ended.

When the setting temperature is the same between the driver space and the passenger space, the target temperature T1, T2 is also the same between the driver space and the passenger space. Therefore, the air mix doors 6a and 6b are fixed to MAX-HOT and the rotation number of the compressor 21 is controlled in a manner that a temperature detected by the temperature sensor 48 (for example, the driver-side sensor 48), that is arranged downstream of the heating heat exchanger 22, becomes equal to the target temperature T1, T2.

When the setting temperature for the driver space is higher than the setting temperature for the passenger space, the target temperature T1 for the driver space is also higher than the target temperature T2 for the passenger space. The driver-side air mix door 6a is fixed to MAX-HOT, and the rotation number of the compressor 21 is controlled such that a temperature detected by the driver-side temperature sensor 48 becomes equal to the target temperature T1. At this time, the open degree of the passenger-side air mix door 6b is controlled based on the input value of the passenger-side temperature sensor 48 so that the passenger space has the target temperature T2.

When the setting temperature for the driver space is lower than the setting temperature for the passenger space, the target temperature T1 for the drive space is also lower than the target temperature T2 for the passenger space. The passenger-side air mix door 6b is fixed to MAX-HOT, and the open degree of the driver-side air mix door 6a is controlled. The rotation number of the compressor 21 is controlled based on the input value of the passenger-side temperature sensor 48.

Operation mechanism will be described. If the passenger-side air mix door 6b is closed from a state where the driver-side and passenger-side air mix doors 6a and 6b have the MAX-HOT state, the heat radiation property of the second section of the heating heat exchanger 22 (corresponding to the second independent passage 62 for the passenger space) is lowered. Therefore, refrigerant flowing through the second section of the heating heat exchanger 22 becomes difficult to condense, therefore the pressure loss is increased. The flow rate of refrigerant in the second section is reduced for balancing in the refrigerant pressure loss, to have approximately the same pressure loss as the first section of the heating heat exchanger 22. Thus, refrigerant flow rate in the first section and refrigerant flow rate in the second section are stabilized at a fixed ratio in the heating heat exchanger 22.

In FIG. 2, the refrigerant flow rate is represented by the size of the arrow direction. Originally, as shown of a dashed line of FIG. 2, the refrigerant flow rate is equal between the first section and the second section in the heating heat exchanger 22. However, when the heat radiation property is changed by changing the open degree of the air mix door 6a, 6b, the refrigerant flow rate balances to have the same refrigerant pressure loss between the first section and the second section, and the refrigerant flow rate is changed to have a ratio shown of continuous-line arrow directions of FIG. 2.

If the rotation number of the compressor 21 is assumed to be constant, the refrigerant flow rate is lowered in the second section, and is raised in the first section. The rotation number of the compressor 21 is lowered by the increase amount in the flow rate in the first section, therefore a temperature of air in the first independent passage 61 can be made to have the target temperature T1 and a temperature of air in the second independent passage 62 can be made to have the target temperature T2.

According to the first embodiment, the case 2 has the first independent passage 61 and the second independent passage 62 independent from each other. The driver-side air mix door 6a is arranged in the first passage 61, and the passenger-side air mix door 6b is arranged in the second passage 62. The cool passage 61b, 62b and the warm passage 61a, 62a are defined in each of the first independent passage 61 and the second independent passage 62. Because the independent passages 61 and 62 are independent from each other, it is possible to control the heat release amount, with respect to the setting temperatures set for the independent passage 61 and the independent passage 62, by controlling the amount of air passing through the heating heat exchanger 22.

The inside space of the heating heat exchanger 22, through which air passes, is divided into the first section and the second section when the case 2 is seen in the air flowing direction. The first section corresponds to the first independent passage 61 and the second section corresponds to the second independent passage 62. The refrigerant flowing direction in the heating heat exchanger 22 corresponds to an extending direction of the border portion through which the first section and the second section are located adjacent with each other in a direction perpendicular to the refrigerant flowing direction and the air flowing direction.

In other words, refrigerant in each of the first section and the second section of the heating heat exchanger 22 flows in parallel with the border portion that partitions the first section and the second section. Therefore, when the heat release amount is different between the first section and the second section, for example when the air amount becomes small in the second passage 62 than in the first passage 61 to reduce the heat release amount in the second passage 62, refrigerant becomes difficult to condense in the second section, therefore the pressure loss is increased. At this time, the refrigerant flow rate is reduced in the second section to have the same pressure loss as the first section. Thus, the refrigerant flow rate can have the fixed ratio between the first section corresponding to the passage 61 and the second section corresponding to the passage 62.

In a comparison example where the refrigerant flowing direction intersects perpendicular to the border portion, the refrigerant flow rate does not change between the first section and the second section. In the comparison example, the pressure loss becomes large in a section where the air amount is reduced, and the efficiency gets worse, as a result, so power consumed by the compressor will be increased.

According to the first embodiment, the ratio of refrigerant flow rate between the first section and the second section can be controlled, so that the temperature of conditioned air can be individually set for each of the driver space and the passenger space by controlling the air amount using the air mix door 6a and 6b. Accordingly, in the air-conditioner 100 using the heat pump refrigerating cycle 3, the air temperature can be independently set for each air outlet, and the cycle 3 can be operated efficiently.

Moreover, while the refrigerating cycle 3 carries out a heating operation, if one of the air outlets is set to have the highest temperature, the ECU 10 controls the air mix door in the independent passage corresponding to the one of the air outlets to have the largest air amount. Therefore, temperature control can be performed for air which should be heated the most by controlling the rotation number of the compressor, and temperature control can be performed for air in the other independent passage where the setting temperature is low by controlling the open degree of the corresponding air mix door.

(Second Embodiment)

A second embodiment will be described with reference to FIG. 4 that illustrates an arrangement relationship between a heating heat exchanger 22A and the independent passages 61 and 62. The mounting direction of the heating heat exchanger 22A relative to the vehicle is different from that of the first embodiment.

In the heating heat exchanger 22A, refrigerant flows from an end (right end in FIG. 4) to the other end (left in FIG. 4) in the tube 74 of the core part 71. The tubes 74 are arranged in the up-and-down direction in which the inflow tank 72 and the outflow tank 73 extend.

Figure 4:
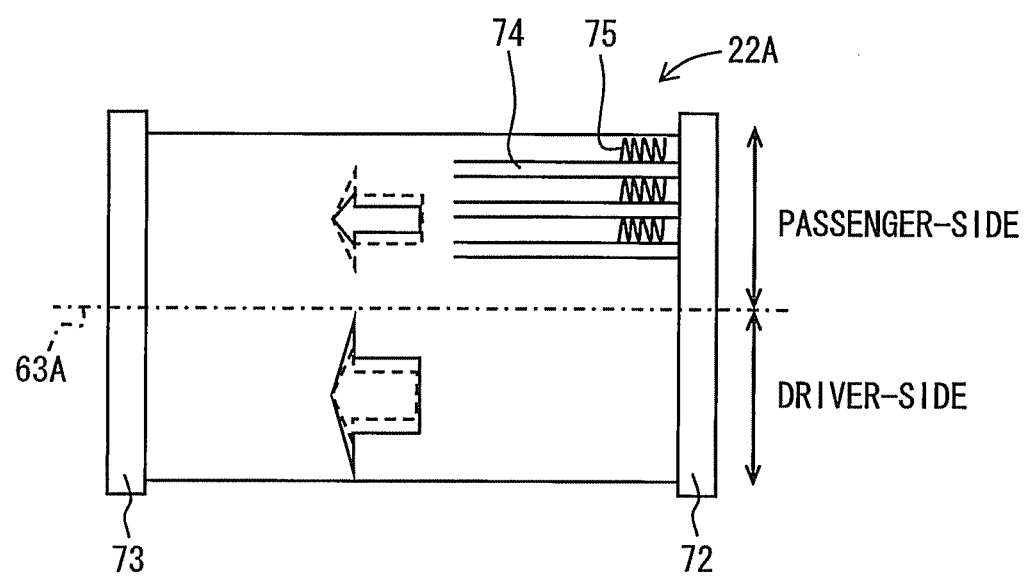
FIG. 4 is a schematic front view illustrating a heating heat exchanger of an air-conditioner according to a second embodiment.

Refrigerant flows from left to right in FIG. 4 when the case 2 is seen in the air flowing direction. The up-and-down direction of FIG. 4 corresponds to the vertical direction. The heating heat exchanger 22A is mounted to the vehicle to have a cross-flow.

A partition plate 63A partitions and defines the first independent passage 61 and the second independent passage 62. When seen in the air flowing direction of the case 2, the plate 63A partitions inside space of the heating heat exchanger 22A into a first section and a second section. The first section corresponds to the first independent passage 61, and the second section corresponds to the second independent passage 62. The plate 63A corresponds to a border portion defined between the first section and the second section adjacent with each other, and extends in the refrigerant flowing direction (left-and-right direction of FIG. 4) in the heating heat exchanger 22A.

The second embodiment achieves the same advantages as the first embodiment. That is, regardless of the mounting direction, the same advantages can be obtained by satisfying the position relationship condition between the plate 63A and the independent passages 61 and 62.

(Third Embodiment)

A third embodiment will be described with reference to FIGS. 5 and 6. In the third embodiment, the temperature sensor 48 of the first embodiment is eliminated, and the air mix door is controlled using the refrigerant pressure of the heating heat exchanger 22 detected by the high-pressure refrigerant pressure sensor 42a.

Figure 5:
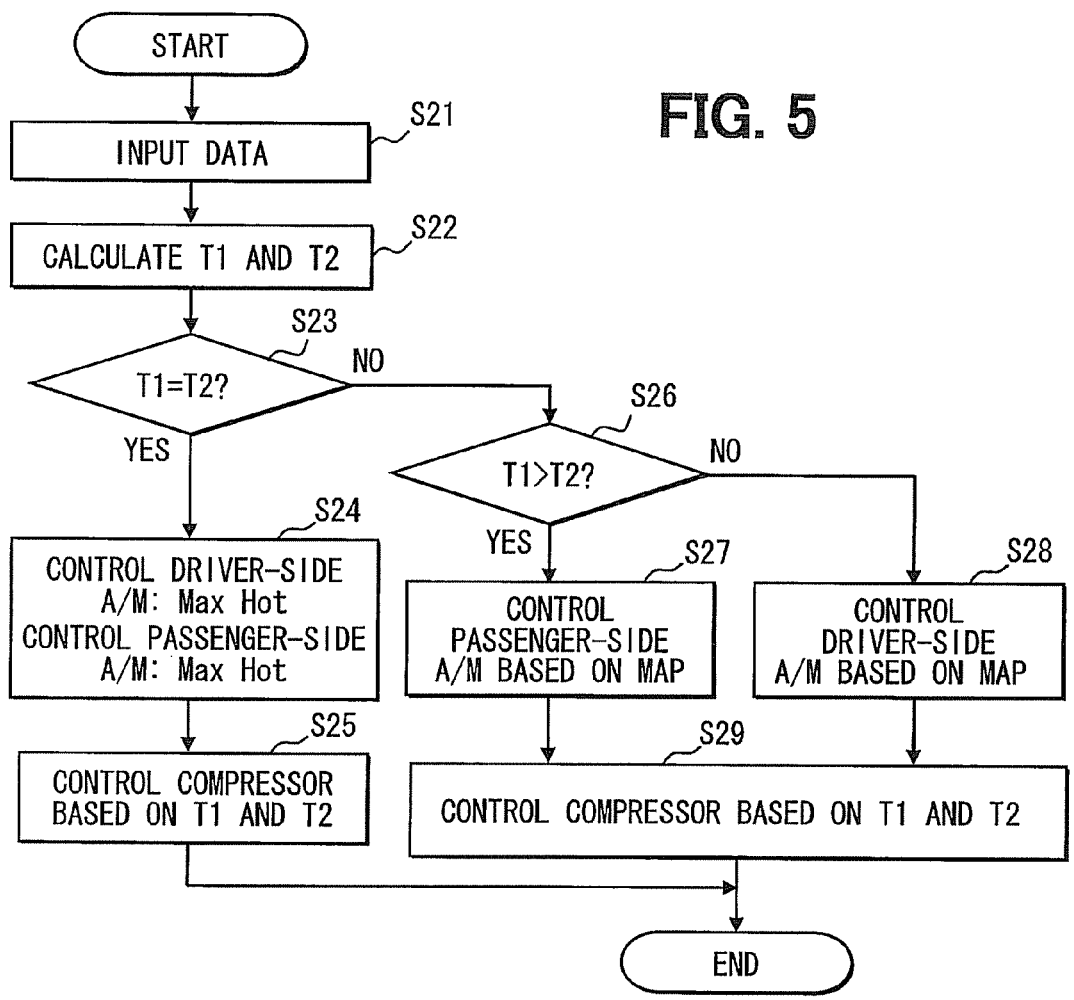
FIG. 5 is a flow chart illustrating a heating mode process processed by an electronic control unit of an air-conditioner according to a third embodiment.

FIG. 5 is a flow chart illustrating a process conducted by the ECU 10 of the third embodiment. S21, S22, S23, S24 and S25 of FIG. 5 are similar to S11, S12, S13, S14 and S15 of FIG. 3, respectively.

At S26 of FIG. 5, because the target temperatures T1 and T2 are not mutually equal with each other, the ECU 10 determines which is larger between the target temperature T1 for the driver space and the target temperature T2 for the passenger space. When the target temperatures T1 for the driver space is higher than the target temperature T2 for the passenger space, the process moves to S27. When the target temperatures T1 for the driver space is lower than the target temperature T2 for the passenger space, the process moves to S28.

At S27, because the target temperature T1 for the driver space is high, the open degree of the driver-side air mix door 6a is controlled to become the maximum (MAX-HOT), and the open degree of the passenger-side air mix door 6b is controlled using a control map memorized in the memory in advance, then the process moves to S29.

Figure 6:
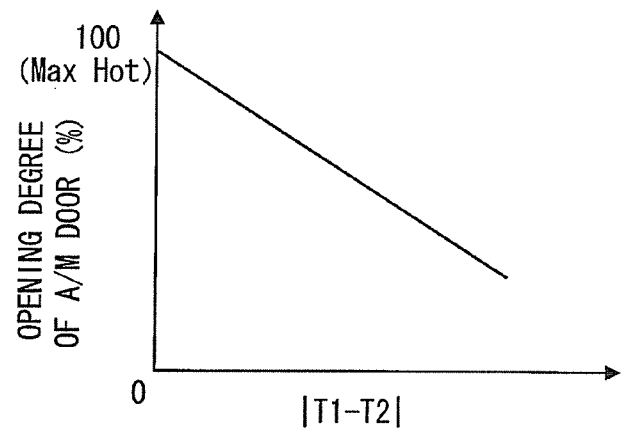
FIG. 6 is a control map graph illustrating a relationship between a difference of target temperatures and an opening degree of an air mix door of the air conditioner of the third embodiment.

FIG. 6 is an example of the control map. As shown in FIG. 6, as a difference between the target temperatures T1 and T2 (|T1−T2|) becomes smaller, the open degree of the passenger-side air mix door 6b is made close to 100% (MAX-HOT). As the difference between the target temperatures T1 and T2 (|T1−T2|) becomes larger, the open degree of the passenger-side air mix door 6b is made smaller. Such relationship between the difference between the target temperatures T1 and T2 (|T1−T2|) and the open degree of the passenger-side air mix door 6b is memorized in advance as the control map.

At S28, because the target temperature T2 for the passenger space is high, the open degree of the passenger-side air mix door 6b is controlled to become the maximum (MAX-HOT), and the open degree of the driver-side air mix door 6a is controlled using a control map memorized in the memory in advance, then the process moves to S29.

At S29, the rotation number of the compressor 21 is controlled in a manner that the driver space has the target temperature T1 and that the passenger space has the target temperature T2, and the process is ended.

According to the third embodiment, the process load of the ECU 10 can be reduced by using the control map. The open degree of the air mix door is controlled by the ECU 10 using the refrigerant pressure of the heating heat exchanger 22 detected by the high-pressure refrigerant pressure sensor 42a. Therefore, the air amount can be suitably set for the independent passage, which has the lower target temperature, based on the detected refrigerant pressure. Thus, the air-conditioning can be quickly completed to have the present temperature and the preset temperature can be kept.

(Other Embodiments)

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The air-conditioner 100 may condition air independently between a front space and a rear space of the passenger compartment, instead of between the driver space and the passenger space. The number of independent passages may be equal to or larger than three, other than the two.

The core part 71 may have plural layers, instead of one layer. The cross-sectional area is the same between the first section and the second section, as shown in FIGS. 2 and 4. Alternatively, the cross-sectional area through which air passes may be different between the first section and the second section of the heating heat exchanger 22.

Such changes and modifications are to be understood as being within the scope of the present disclosure as defined by the appended claims.

What is claimed is:

1. An air-conditioner that conditions air inside of a passenger compartment of a vehicle using a heat pump refrigerating cycle, the air-conditioner comprising:

a case having at least a first air passage and a second air passage independent from each other and extending in an air flowing direction, wherein the case has an air inlet and a plurality of air outlets located opposite from the air inlet, the plurality of air outlets respectively corresponding to a plurality of seats in the vehicle, the plurality of seats having a predetermined seat including at least a driver seat, the plurality of seats having another seat;

a blower sending air into the first air passage and the second air passage of the case;

an indoor heat exchanger disposed in the case to cool air sent by the blower; and a heating heat exchanger disposed downstream of the indoor heat exchanger in the air flowing direction in the case to heat air passing through the indoor heat exchanger, the indoor heat exchanger and the heating heat exchanger being a part of the heat pump refrigerating cycle, wherein the first air passage introduces air from the air inlet to one of the air outlets corresponding to the predetermined seat, and the second air passage introduces air from the air inlet to another of the air outlets corresponding to the another seat, each of the first air passage and the second air passage has a warm passage through which warm air heated by the heating heat exchanger passes and a cool passage through which cool air passes the indoor heat exchanger and bypasses the heating heat exchanger, the air-conditioner further comprising:

a first air mix door controlling a ratio between the warm air and the cool air in the first air passage and a second air mix door controlling a ratio between the warm air and the cool air in the second air passage, the amount of the warm air being increased by increasing an open degree of each of the first air mix door and the second air mix door;

a temperature setting portion through which a first temperature of conditioned air to be blown from the first air passage and a second temperature of conditioned air to be blown from the second air passage are set; and a controller controlling the amount of the warm air by controlling the open degree of each of the first air mix door and the second air mix door, inside space of the heating heat exchanger is divided into a first section corresponding to the first air passage and a second section corresponding to the second air passage when the case is seen in the air flowing direction, the heating heat exchanger has a refrigerant passage through which refrigerant flows in parallel and a border portion through which the first section and the second section are located adjacent to each other, wherein a refrigerant flow rate is controlled such that a pressure loss across the first section and the second section is equalized, and the controller controls the open degree of the first air mix door to be larger than the open degree of the second air mix door when the temperature setting portion sets the first temperature to be higher than the second temperature, while the heating pump refrigerating cycle is conducting a heating operation, wherein the controller compares the first temperature and the second temperature, the controller controls the open degree of the first air mix door to be the maximum and controls the open degree of the second air mix door to be the maximum when the controller determines that the first temperature is equal to the second temperature, the controller controls the open degree of the first air mix door to be the maximum when the controller determines that the first temperature is higher than the second temperature, and the controller controls the open degree of the second air mix door to be the maximum when the controller determines that the first temperature is lower than the second temperature, and wherein the heating heat exchanger conditions air using only the heat pump refrigerating cycle without using coolant of an internal combustion engine of the vehicle.

2. The air-conditioner according to claim 1, wherein the controller controls the open degree of the first air mix door to have the maximum air amount when the temperature setting portion sets the first temperature to the highest possible temperature setting, while the heating pump refrigerating cycle is conducting a heating operation.

3. The air-conditioner according to claim 2, further comprising:

a temperature detector detecting a temperature of air downstream of the heating heat exchanger in each of the first air passage and the second air passage, wherein the controller controls the open degree of the second air mix door based on the temperature of air detected by the temperature detector in a manner that the conditioned air to be blown from the second air passage has the second temperature.

4. The air-conditioner according to claim 2, further comprising:

a pressure detector detecting a pressure of refrigerant in the heating heat exchanger, wherein the controller controls the open degree of the second air mix door based on the pressure of refrigerant detected by the pressure detector in a manner that the conditioned air to be blown from the second air passage has the second temperature.

5. The air-conditioner according to claim 1, wherein the refrigerant flow rate has a fixed ratio between the first section and the second section.

6. The air-conditioner according to claim 1, wherein the refrigerant flow rate is capable of being reduced in the second section to have the same pressure loss as the first section.

7. The air-conditioner according to claim 1, wherein the heating heat exchanger further includes a core portion, an inflow tank and an outflow tank; the core portion is constructed by layering a plurality of inner tubes and a plurality of fins, a first end of each of the plurality of inner tubes is connected to the inflow tank and a second end of each of the plurality of inner tubes is connected to the outflow tank such that refrigerant stored in the inflow tank flows into each of the plurality of inner tubes, and flows from the inflow tank to the outflow tank.

8. The air-conditioner according to claim 1, wherein the first section corresponds to the first air passage provided to condition air in a driver space of the vehicle, and the second section corresponds to the second air passage provided to condition air in a passenger space of the vehicle.

9. The air-conditioner according to claim 8, wherein the first temperature is a target temperature of conditioned air to be blown for the driver space, and the second temperature is a target temperature of conditioned air to be blown for the passenger space.

10. The air-conditioner according to claim 1, wherein the controller compares the first temperature and the second temperature when the heating pump refrigerating cycle is conducting the heating operation.

11. The air-conditioner according to claim 1, wherein when the controller determines that the first temperature is higher than the second temperature, the controller fixes the open degree of the first air mix door to be the maximum, and controls the open degree of the second air mix door based on the second temperature, and when the controller determines that the first temperature is lower than the second temperature, the controller fixes the open degree of the second air mix door to be the maximum, and controls the open degree of the first air mix door based on the first temperature.

12. The air-conditioner according to claim 1, wherein the first air mix door and the second air mix door are controlled independently from each other.

13. The air-conditioner according to claim 1, wherein the controller fixes the open degree of at least one of the first air mix door and the second air mix door to be the maximum.

* * * * *